United States Patent [19]

Rock et al.

[11] Patent Number: 4,673,708
[45] Date of Patent: Jun. 16, 1987

[54] IMPACT MODIFIED POLYETHERIMIDE-POLYCARBONATE BLENDS

[75] Inventors: John A. Rock, Becket; Norman E. Durfee, Jr., Lanesboro, both of Mass.; Robert O. Johnson, Marietta, Ga.

[73] Assignee: General Electric Company, Pittsfield, Mass.

[21] Appl. No.: 687,026

[22] Filed: Dec. 28, 1984

[51] Int. Cl.$^4$ ............................................... C08L 79/08
[52] U.S. Cl. ......................................... 525/66; 525/67; 525/146; 525/148; 525/902
[58] Field of Search ................... 525/66, 67, 146, 148, 525/902

[56] References Cited

U.S. PATENT DOCUMENTS

| | | | |
|---|---|---|---|
| 3,946,090 | 3/1976 | Margotte et al. | 260/857 R |
| 4,217,424 | 8/1980 | Weese et al. | 525/67 |
| 4,225,687 | 9/1980 | deTorres | 525/423 |
| 4,250,279 | 2/1981 | Robeson et al. | 525/425 |
| 4,299,928 | 11/1981 | Witman | 525/67 |
| 4,393,168 | 7/1983 | Giles, Jr. et al. | 525/66 |
| 4,395,518 | 7/1983 | Giles, Jr. et al. | 525/180 |

*Primary Examiner*—Theodore E. Pertilla
*Attorney, Agent, or Firm*—Bernard, Rothwell & Brown

[57] ABSTRACT

Ternary polymer blends contain (a) a polyetherimide, (b) a polycarbonate and (c) a minor amount of an acrylic rubber interpolymer composite. These blends are characterized by high impact strengths and advantageous processing temperatures.

19 Claims, No Drawings

IMPACT MODIFIED POLYETHERIMIDE-POLYCARBONATE BLENDS

BACKGROUND OF THE INVENTION

Binary blends of polyetherimides and polycarbonates are known. Such blends exhibit higher heat distortion temperatures and improved flexural and tensile strengths over the polycarbonate component alone and are able to be processed at temperatures below those associated with the polyetherimide component of the blends.

While it is known to form blends of a polyetherimide and an acrylate copolymer, the processing temperatures of these binary blends are nearly as high as those of the polyetherimides alone. See U.S. Pat. No. 4,395,518. While the addition of an acrylate copolymer does increase impact strengths of polyetherimides, products made with high levels of an acrylate copolymer have been known to delaminate. Therefore, there exists a need for a composition which exhibits excellent impact properties which can be processed at relative low temperatures and which maintains the other desirable physical and chemical properties of polyetherimides.

SUMMARY OF THE INVENTION

In accordance with the present invention, the ternary polymeric blend contains in admixture a polyetherimide, a polycarbonate and a minor amount of an acrylic rubber interpolymer composite. The blends exhibit higher impact strengths than those associated with the polyetherimide component or a blend of a polyetherimide and polycarbonate.

DETAILED DESCRIPTION OF THE INVENTION

The present invention relates to ternary polymer blends. More particularly, the invention relates to modified polyetherimide/polycarbonate blends having significantly improved impact strengths. Surprisingly, the addition of an acrylic rubber interpolymer composite does not adversely affect tensile and flexural properties or heat distortion characteristics of the unmodified polymer blends.

As used herein, the term "polycarbonate" includes polymers prepared by reacting a dihydric phenol with a carbonate precursor as well as copolyestercarbonates, which are prepared by reacting an aromatic dicarboxylic acid or reactive derivative thereof, a dihydric phenol and a carbonate precursor.

The polyetherimide component of the blends of this invention contain repeating groups of the formula:

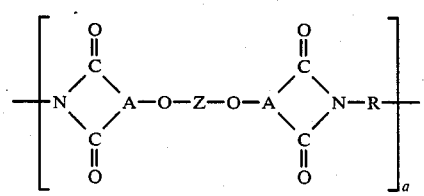

where "a" represents a whole number in excess of 1, e.g., 10 to 10,000 or more, the group —O—A< is selected from:

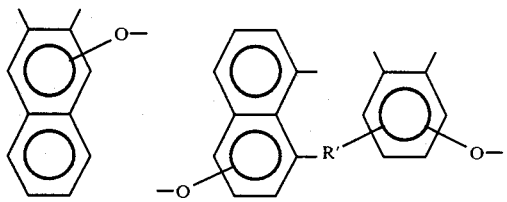

R' being hydrogen, lower alkyl or lower alkoxy. Preferably, the polyetherimide includes the latter —O—A< group where R' is hydrogen, such that the polyetherimide is of the formula:

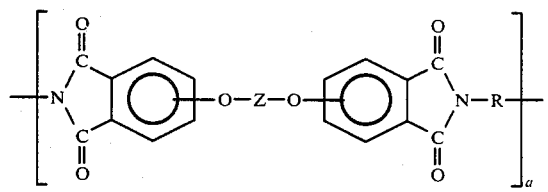

and the divalent bonds of the —O—Z—O— radical are in the 3,3'; 3,4'; 4,3' or the 4,4' position; Z is a member of the class consisting of (1)

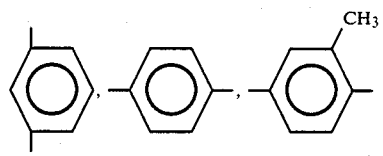

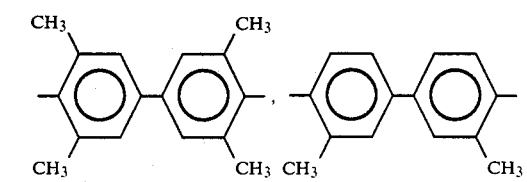

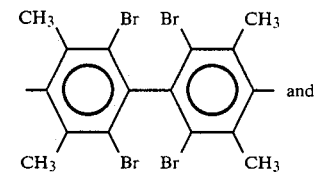

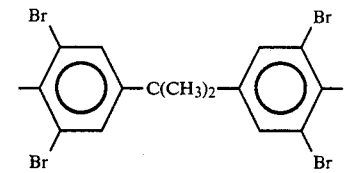

and (2) divalent organic radicals of the general formula:

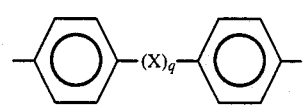

where X is a member selected from the class consisting of divalent radicals of the formulas,

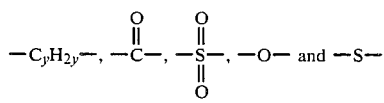

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_2$ to $C_8$ alkylene terminated polydiorganosiloxane, and (3) divalent radicals included by the formula

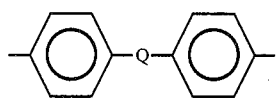

where Q is a member selected from the class consisting of

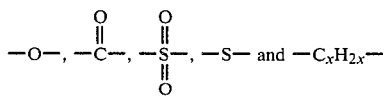

where x is a whole number from 1 to 5 inclusive. Particularly preferred polyetherimides for the purposes of the present invention include those where —O—A< and Z respectively are:

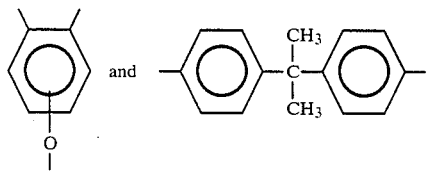

and R is selected from:

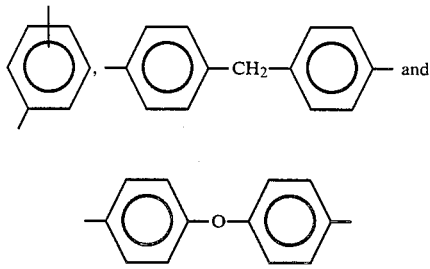

The polyetherimides where R is m-phenylene are most preferred.

In one embodiment, the polyetherimide may be a copolymer which, in addition to the etherimide units described above, further contains repeating units of the formula

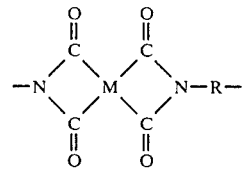

wherein R is as previously defined and M is selected from the group consisting of

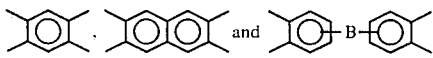

where B is

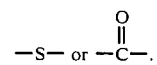

These polyetherimide copolymers are described by Williams et al. in U.S. Pat. No. 3,983,093, incorporated herein by reference.

The polyetherimides can be obtained by any of the methods well known to those skilled in the art including the reaction of an aromatic bis(ether anhydride) of the formula:

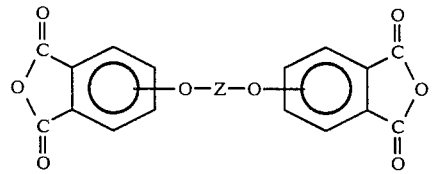

where Z is as defined hereinbefore with an organic diamine of the formula $H_2N—R—NH_2$ where R is as defined hereinbefore.

Aromatic bis(ether anhydride)s of the above formula include, for example, 2-bis[4-(2,3-dicarboxyphenoxy)-phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-3,4-dicarboxyphenoxy)phenyl]propane dianhydride; 4,4'-bis(3,4-dicarboxy)diphenyl ether dianhydride; 4,4'-bis(3,4-dicarboxy)diphenyl sulfide dianhydride; 1,3-bis(3,4-dicarboxyphenoxy)benzene dianhydride; 1,4-bis(3,4-dicarboxyphenoxy)benzene dianhydride; 4,4-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s included in the above formulas are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh. Org. Khin., 4(5) 774 (1968).

Organic diamines of the above formulas include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5 diaminonaphthalene, 3,3'-dimethylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylene diamine, octamethylenediamine, 3-methoxyhexamethyenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenedediamine, bis(3-aminopropyl)tetramethyldisiloxane, bis(4-aminobutyl)tetramethyldisiloxane, etc. and mixtures of such diamines.

In general, the reactions can be carried out by employing well-known solvents, e.g., o-dichlorobenzene, m-cresol/toluene, etc. to effect interaction between the dianhydrides and the diamines, and temperatures of from about 100° C. to about 250° C. Alternatively, the polyetherimides can be prepared by melt polymerization of any of the above dianhydrides with any of the above organic diamines while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Included in the many methods of making the polyetherimides are those disclosed in Heath et al., U.S. Pat. No. 3,847,867, Williams U.S. Pat. No. 3,847,869, Takekoshi et al., U.S. Pat. No. 3,850,885, White U.S. Pat. No. 3,852,242 and U.S. Pat. No. 3,855,178, etc. These disclosures are incorporated herein in their entirety by reference for the purpose of teaching, by way of illustration, general and specific methods for preparing polyetherimides suitable for the blends of this invention.

Polycarbonates for use in the blends of the invention are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors and generally contain recurring structural units of the formula;

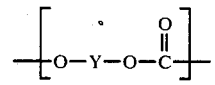

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane, and 3,3'-dichloro-4,4'-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with a hydroxy or acid terminated polyester, or with a dibasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate such as di(tolyl)carbonate, etc., di(naphthyl)carbonate, di(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in the U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

The acrylic rubber interpolymer composite which is utilized in the present invention generally comprise from about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylate rubber core which is crosslinked with about 0.1 to 5 percent by weight of a suitable cross-linking monomer and to which is added about 0.1 to 5 percent by weight of a graft-linking monomer.

Suitable alkyl acrylates include methyl acrylate, ethyl acrylate, isobutyl acrylate and n-butyl acrylate. The preferred acrylate is n-butyl acrylate.

The cross-linking monomer is a polyethylenically unsaturated monomer having a plurality of additional polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate.

The graft-linking monomer is a polyethylenically unsaturated monomer having a plurality of addition polymerizable reactive groups, at least one of which polymerizes at a substantially different rate of polymerization than the other reactive groups. The graft-linking monomer provides a residual level of unsaturation in the elastomeric phase, particularly in the latter stages of polymerization and, consequently, at or near the surface of the elastomeric particle. The preferred graft-linking monomer is alkyl methacrylate and dialkyl maleate.

The rigid thermoplastic phase can be comprised of $C_1$ to $C_{16}$ methacrylate, styrene, acrylonitrile, alkyl acrylates, alkyl methacrylate, dialkyl methacrylate and the like. Preferably, this phase is at least about 50 weight percent $C_1$ to $C_4$ alkyl methacrylate.

In a preferred embodiment of the present invention, the acrylate graft polymer is an acrylic rubber interpolymer composite which is available commercially from the Rohm & Haas Corporation, Philadephia, Pa. under the tradename Acryloid ® KM-330. That acrylate graft polymer is characterized in that its acrylic rubber core comprises n-butyl acrylate and in that its cross-linking agent is 1,3-butylene diacrylate, and in that is graft-linking agent is dialkyl maleate and in that the rigid thermoplastic phase monomeric system is methyl methacrylate.

Additional suitable acrylate graft copolymers are those described in U.S. Pat. No. 4,022,748, incorporated by reference herein.

In accordance with the present invention, useful blends of a polyetherimide, polycarbonate and a minor amount of an acrylic rubber interpolymer composite are generally obtainable in a variety of proportions of the polymers relative to each other. The polyetherimide component is generally present in amounts of from about 19 to about 79 weight percent of the total weight of the ternary blend. Preferably, the polyetherimide is present in amounts of from about 55 to about 72 weight percent of the blend. The polycarbonate component is generally present in amounts of from about 20 to about 80 weight percent of the total weight of the ternary blend. Preferably, the polycarbonate is present in amounts of from about 25 to about 40 weight percent of the total ternary blend. The acrylic rubber interpolymer composite component is always present in minor amounts, for example, from about 1 to about 10 weight percent of the total weight of the ternary blend. Preferably, the acrylic rubber interpolymer composite is present in amounts of from about 3 to about 5 weight percent of the total weight of the ternary blend.

In general, the ternary blends can be tailored to provide desired physical characteristics by selecting appropriate properties of the blend components. Higher proportions of polyetherimide usually contribute to superior mechanical properties and higher heat deflection temperatures for the blend. Higher proportions of the polycarbonate usually contribute to lowering the glass transition temperatures and the melt viscosities of the blend. Higher proportions of the acrylic rubber interpolymer composite generally provide higher impact strength for the blend.

It is contemplated that the blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides in combination with one or more polycarbonates or two or more polycarbonates in combination with one or more polyetherimides.

Optionally, the ternary blends may also be modified by addition of a polyester of the formula

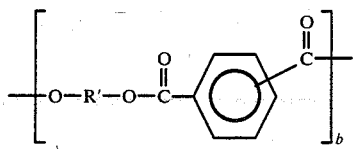

where b represents a whole number in excess of 1, R' is a divalent alkylene radical containing from 1 to 10 carbon atoms and the two carbonyl groups are located on the aromatic ring in a para- or meta-position relative to each other.

Generally, for every 100 parts of the ternary blend, there may be added from about 1 to about 75 parts of a polyester. Preferably, there is added from about 5 to about 30 parts of a polyester for every 100 parts of the ternary blends. The addition of one or more polyesters to the ternary blends of the present invention lowers the melt viscosity of the overall blend. Obviously, the higher the level of polyester, the more the melt viscosity of the blend is reduced.

The polyesters can be obtained by any of the methods well known to those skilled in the art including the reaction of an aromatic dicarboxylic acid with an aliphatic diol.

As used herein, the term polyesters include those esters prepared by esterifying or transesterifying terephthalic acid and isophthalic acid.

Prepared polyesters include polyethylene terephthalate and polybutylene terephthalate resins, hereafter sometimes referred to as PET and PBT, respectively. In general, the PET and PBT resins comprise high molecular weight poly(1,2-ethylene terephthalate) resins and poly(1,4-butylene terephthalate) resins having repeating units of the general formulas, respectively:

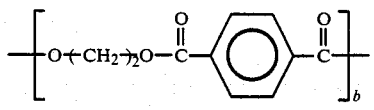

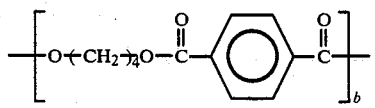

and mixtures thereof, b being as previously defined.

The preferred polyesters of this invention include PET copolyesters and PBT copolyesters, i.e., esters that contain a minor amount, e.g., from about 0.5 to about 2% by weight, of repeating units derived from an aliphatic or another aromatic dicaboxylic acid and/or another aliphatic diol and polyol. Among the units which can be present in the copolyesters are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized unsaturated acids, and the like. Among the units in the copolyesters can also be minor amounts derived from aromatic dicarboxylic acids, e.g., acids having up to about 36 carbon atoms, such as isophthalic acid and the like. In addition to the PET and PBT units derived from ethylene glycol and 1,4-butylene glycol, respectively, there can also be minor amounts of units derived from other aliphatic glycols and polyols, e.g., di- and polyols having up to about 50 carbon atoms, including ethylene glycol, propylene glycol, butylene glycol, cyclohexanediol, and the like.

Generally, useful high molecular weight polyester resins have an intrinsic viscosity of at least 0.2 and preferably about 0.8 deciliters per gram (dl/g) as measured in o-chlorophenol, a 60/40 phenoltetrachloroethane mixture or similar solvent systems when measured at 25°–30° C. The upper intrinsic viscosity limit is not critical, however it will generally be about 2.5 dl/g. Especially preferred polyester resins will have a intrinsic viscosity within the range of from about 0.5 to about 1.3.

Among the many methods of making the polyesters which are hereby incorporated herein in their entirety by reference, are those disclosed in the Encyclopedia of Polymer Science and Technology, Vol. II, entitled "Polyesters", pages 62–128, published by Interscience Publishers (1969), as well as those disclosed in Wirth et al., U.S. Pat. Nos. 3,787,64 and 3,838,097, etc., and Winfield et al., U.S. Pat. No. 2,465,319, Pengilly, U.S. Pat. No. 3,047,539, etc.

Methods for forming blends of the present invention may vary considerably. Conventional blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The subject blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blend of this invention may be used in applications where films have been used previously. Thus, the blends of the present invention can be used in automotive and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific polymeric blends in accordance with the present invention. It should be understood that the examples are given for the purpose of illustration and do not limit the invention. In the examples, all parts and percentages are by weight unless otherwise specified.

EXAMPLES 1-6

Blends according to the present invention were prepared by mixing the components in varying proportions and then extruding the mixture in a Werner Pfleiderer extruder. The various components as well as the parts thereof in each of the six blends are indicated in Table I below. The resulting extrudate blends were comminuted into pellets and the pellets injection molded into test specimens. Various physical properties of the blends were determined and are given in Table 2. For comparative purposes, an unmodified polyetherimide, which was the same polyetherimide used to form the blends, was tested and is listed in Table 2 under the heading "control."

TABLE I

|  | 1 | 2 | 3 | 4 | 5 | 6 |
|---|---|---|---|---|---|---|
| Polyetherimide[1] | 75 | 70 | 70 | 70 | 70 | 67 |
| Polycarbonate[2] | 25 | 30 | 30 | 30 | — | 33 |
| Copolyestercarbonate/Polycarbonate[3] | — | — | — | — | 30 | — |
| Acrylate Graft Copolymer[4] | 5 | 4 | 3 | 2 | 3 | 5 |
| Polyester[5] | — | — | — | — | — | 27 |

[1] The polyetherimide was a commercial polyetherimide sold under the trademark ULTEM ® by the General Electric Company and identified as ULTEM 1000—1000.
[2] The polycarbonate was a commercial polycarbonate sold under the trademark LEXAN ® by the General Electric Company and identified as LEXAN 101-112.
[3] The copolyestercarbonate/polycarbonate was a blend of 82 percent by weight of a copolyestercarbonate was prepared by reacting bisphenol A, phosgene and an 85/15 weight of a polycarbonate homopolymer prepared from bisphenol A and phosgene.
[4] The acrylate graft copolymer was Acryloid ® KM-330 available commercially by the Rohm and Haas Company of Philadelphia, Pa.
[5] The polyester was a commercial polybutylene terephthalate sold under the tradename VALOX 310-1001.

TABLE 2

|  | ASTM TEST | ASTM UNITS | Control | Example #1 | Example #2 | Example #3 | Example #4 | Example #5 | Example #6 |
|---|---|---|---|---|---|---|---|---|---|
| Notched Izod Impact | D256 | ft-lb/in. | 1.0 | 1.9 | 2.2 | 1.8 | — | 2.1 | 1.1 |
| Reverse Notched Impact | D256 | ft-lb/in | 25. | >16 | 57(NB)[1] | — | — | — | >16 |
| Gardner Impact (73° F.) | — | in-lb | >320 | — | >320 | >320 | — | >320 | >400 |
| Gardner Impact (−20° F.) | — | in-lb | 40 | — | >320 | 73 | — | — | — |
| Scored*Gardner Impact (73° F.) | — | in-lb | <8 | 20(est) | 316 | 272 | 49 | 116 | >200(est) |
| Scored*Gardner Impact (−20° F.) | — | in-lb | — | — | 45 | — | — | — | — |
| Falling Dart Charpy Impact (73° F.) | — | ft-lb/in |  |  |  |  |  |  |  |
| 0.005" notch radius |  |  | 1.4 | — | 1.8 | — | — | — | — |
| 0.010" notch radius |  |  | 1.5 | — | 3.9 | 2.2 | — | — | — |
| 0.020" notch radius |  |  | 1.4 | — | 4.3 | 3.6 | — | — | — |
| 0.040" notch radius |  |  | 1.7 | — | 16.2 | 11.1 | — | — | — |
| Deflection Temperature (264 psi) | D648 | °C. | 200 | — | 174 | 175 | 172 | 180 | 103 |
| Deflection Temperature (66 psi) | D648 | °C. | 210 | — | 197 | — | — | — | 140 |
| Tensile Strength at Yield | D638 | psi | 15,200 | — | 1,680 | 11,360 | — | — | 10,000 |
| Tensile Elongation, Ult. | D638 | % | 60 | — | >75 | >20 | — | — | 14 |

*The scored Gardner impact test involves the scribing of an "X" on the test sample such that the cross is directly opposite the point of impact (this is to simulate notches and imperfections which might be found on the "back" side of an injection molded part)
NOTE:
For Gardner impact testing a "staircase" procedure was used where possible.
[1] NB = No break As is apparent from the above test results, blends according to the present invention have an improved impact strength over the polyetherimide component by itself. In addition, it was noted that the processing temperatures that can be used for the blends of the present invention are generally lower than those typically employed in the extrusion and molding of polyetherimides which further contributes to the advantages of the present compositions.

While the present invention has been described with reference to particular embodiments thereof, it will be apparent to those skilled in the art that numerous modifications may be made without actually departing from the spirit and scope of the invention as defined in the appended claims.

We claim:
1. A ternary polymeric blend comprising in admixture (a) a polyetherimide, (b) a thermoplastic polycar- bonate and (c) a minor amount of an acrylic rubber interpolymer composite.

2. The ternary polymeric blend of claim 1, wherein the polyetherimide is from about 19 to about 79 weight percent, the polycarbonate is from about 20 to about 80 weight percent and the acrylic rubber interpolymer composite is from about 1 to about 10 weight percent and wherein all weight percents are based on the total weight of the ternary blend.

3. The ternary polymeric blend of claim 2, wherein the polyetherimide is from about 55 to about 72 weight percent, the polycarbonate is from about 25 to about 40 weight percent and the acrylic rubber interpolymer composite is from about 3 to about 5 weight percent of the total weight of the ternary blend.

4. The ternary polymeric blend of claim 1, wherein the polyetherimide contains repeating units of the formula $$\left[-N\begin{matrix}\overset{O}{\underset{\|}{C}}\\ \underset{\|}{\underset{O}{C}}\end{matrix}A-O-Z-O-A\begin{matrix}\overset{O}{\underset{\|}{C}}\\ \underset{\|}{\underset{O}{C}}\end{matrix}N-R-\right]_a$$

where "a" represents a whole number in excess of 1, e.g., 10 to 10,000 or more, the group —O—A< is selected from:

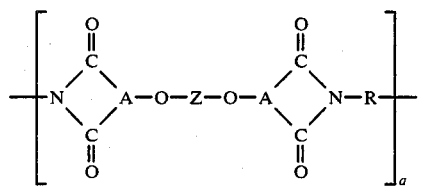

R' being hydrogen, lower alkyl or lower alkoxy; Z is a member of the class consisting of (1)

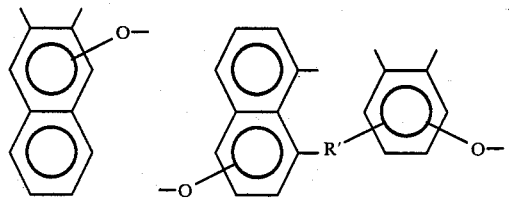

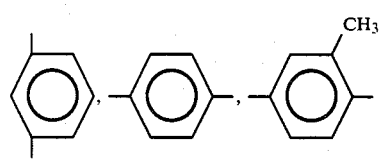

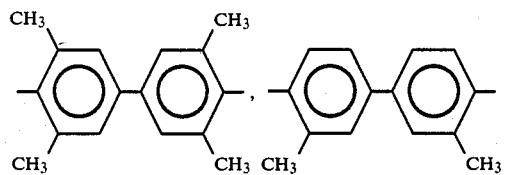

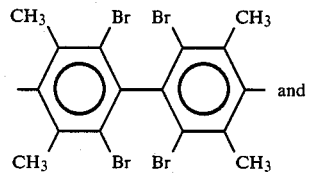

-continued

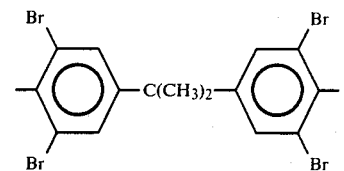

and (2) divalent organic radicals of the general formula:

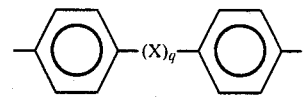

where X is a member selected from the class consisting of divalent radicals of the formulas,

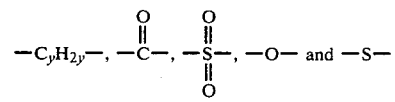

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_2$ to $C_8$ alkylene terminated polydiorganosiloxane, and (3) divalent radicals included by the formula:

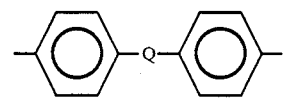

where Q is a member selected from the class consisting of

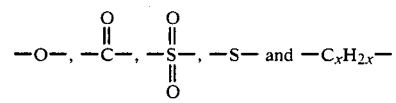

where x is a whole number from 1 to 5 inclusive.

5. The ternary polymeric blend of claim 4, wherein Z is

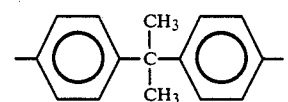

and R is selected from:

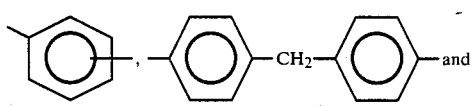

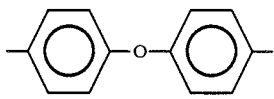

6. The composition of claim 1, wherein the polyetherimide further contains repeating units of the formula

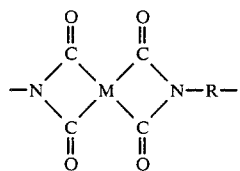

where M is selected from the group consisting of

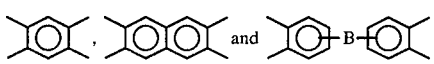

where B is

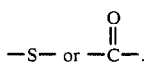

7. The ternary polymeric blend of claim 1, wherein the polycarbonate is derived from a dihydric phenol and a carbonate precursor.

8. The ternary polymeric blend of claim 7, wherein said dihydric phenol is 2,2-bis(4-hydroxyphenyl)propane and the carbonate precursor is carbonyl chloride.

9. The ternary polymeric blend of claim 7, wherein said dihydric phenol is 2,2-bis(4-hydroxyphenyl)propane and the carbonate precursor is diphenyl carbonate.

10. The ternary polymeric blend of claim 7, wherein the polycarbonate contains recurring structural units of the formula:

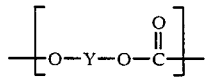

where Y is a divalent aromatic radical of the dihydric phenol employed in the polycarbonate producing reaction.

11. The ternary polymeric blend of claim 1, wherein the polycarbonate includes a copolyestercarbonate derived from a dihydric phenol, a carbonate precursor and an aromatic dicarboxylic acid or reactive derivative thereof.

12. The ternary polymeric blend of claim 11, wherein the aromatic dicarboxylic acid is terephthalic acid or isophthalic acid or a mixture thereof, wherein the weight ratio of terephthalic acid to isophthalic acid is from about 5:95 to about 95:5.

13. The ternary polymeric blend of claim 12, wherein the dihydric phenol is bisphenol A and the carbonate precursor is carbonyl chloride.

14. The ternary polymeric blend of claim 1, wherein the acrylic rubber interpolymer composite comprises from about 25 to 95 percent by weight of a first elastomeric phase polymerized from about 75 to 99.8 percent by weight of $C_1$ to $C_6$ acrylate, 0.1 to 5 percent by weight of a cross-linking monomer and about 0.1 to 5 percent by weight of a graft-linking monomer and about 75 to about 5 percent by weight of a second rigid thermoplastic phase.

15. The ternary polymeric blend of claim 1, wherein the blend is further modified by addition of a polyester of the formula

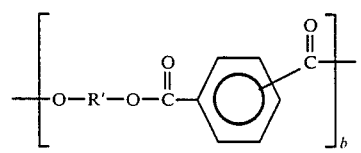

where b represents a whole number in excess of 1, R' is a divalent alkylene radical containing from 1 to 10 carbon atoms, and the two carbonyl groups are located on the aromatic ring in para- or meta-position relative to each other.

16. The ternary polymeric blend of claim 15, wherein for every 100 parts by weight of the ternary blend there is present from about 1 to about 75 parts by weight of polyester.

17. The ternary polymeric blend of claim 15, wherein for every 100 parts by weight of the ternary blend, there is present from about 5 to about 30 parts by weight of polyester.

18. The ternary polymeric blend of claim 16, wherein the polyester is polyethylene terephthalate or polybutylene terephthalate.

19. The ternary polymeric blend of claim 17, wherein the polyester is polyethylene terephthalate or polybutylene terephthalate.

* * * * *